US007071644B2

(12) United States Patent
Kawanobe

(10) Patent No.: US 7,071,644 B2
(45) Date of Patent: Jul. 4, 2006

(54) CONTROL DEVICE OF AUTOMOTIVE POWER PIVOT DOOR

(75) Inventor: Osamu Kawanobe, Kanagawa (JP)

(73) Assignee: Ohi Seisakusho Co., Ltd., Kanagawa (JP)

(*) Notice: Subject to any disclaimer, the term of this patent is extended or adjusted under 35 U.S.C. 154(b) by 74 days.

(21) Appl. No.: 10/820,778

(22) Filed: Apr. 9, 2004

(65) Prior Publication Data

US 2004/0212334 A1 Oct. 28, 2004

(30) Foreign Application Priority Data

Apr. 25, 2003 (JP) ............................ 2003-121566

(51) Int. Cl.

*H02P 1/00* (2006.01)
*H02P 1/22* (2006.01)
*H02P 1/40* (2006.01)
*H02P 3/00* (2006.01)
*H02P 3/20* (2006.01)
*H02P 5/00* (2006.01)
*H02P 7/00* (2006.01)

(52) U.S. Cl. ...................... 318/280; 318/468; 318/282; 318/286; 49/28

(58) Field of Classification Search ..................... None
See application file for complete search history.

(56) References Cited

U.S. PATENT DOCUMENTS 5,448,856 A 9/1995 Moore
5,878,530 A * 3/1999 Eccleston et al. ............. 49/139
5,982,126 A * 11/1999 Hellinga et al. ............ 318/468
5,986,420 A 11/1999 Kato
6,092,336 A 7/2000 Wright
6,181,094 B1 * 1/2001 Menke ....................... 318/434
6,185,868 B1 2/2001 Kato
6,297,605 B1 * 10/2001 Butler et al. ................ 318/466
6,398,288 B1 6/2002 Yuge
6,533,342 B1 * 3/2003 Auer et al. ................... 296/76
6,575,517 B1 * 6/2003 Yamagishi et al. ........... 296/76
6,588,151 B1 * 7/2003 Goscicki et al. .............. 49/340
6,600,285 B1 * 7/2003 Mintgen et al. ............ 318/468
RE38,400 E * 1/2004 Kowall et al. .............. 318/283
6,676,186 B1 * 1/2004 Greif ........................... 296/50
2004/0232723 A1 * 11/2004 Sera et al. ............... 296/146.8

FOREIGN PATENT DOCUMENTS

DE 101 14 938 A1 10/2001
JP 2001-107642 A 4/2001

* cited by examiner

*Primary Examiner*—Marlon T. Fletcher
*Assistant Examiner*—Renata McCloud
(74) *Attorney, Agent, or Firm*—Sughrue Mion, PLLC

(57) ABSTRACT

An automotive power pivot door is powered by an electric motor through an electromagnetic clutch. A control device of the door has a control unit configured to carry out a routine which comprises de-energizing an electric motor and disengaging the clutch when the door is lifted up to a full-open position; detecting a moved distance by which the door moves down from the full-open position within a first predetermined time (t1) from the time on which the clutch is disengaged; engaging the clutch when the detected moved distance is equal to or greater than a first predetermined distance (L1); disengaging the clutch again when a second predetermined time (t2) passes from the time on which the clutch is engaged; repeating the process for engaging and disengaging the clutch while following the routine; and judging that the holder fails to operate when the frequency of the engaged condition of the clutch indicates a predetermined frequency.

11 Claims, 3 Drawing Sheets

CONTROL DEVICE OF AUTOMOTIVE POWER PIVOT DOOR

BACKGROUND OF THE INVENTION

1. Field of the Invention

The present invention relates in general to automotive power pivot doors, and more particularly to control devices of the automotive power pivot doors. More specifically, the present invention is concerned with a control device that controls upward/downward pivot movement of an automotive back door driven by an electric motor with an aid of a clutch.

2. Description of Related Art

Hitherto, various automotive power pivot doors have been proposed and put into practical use particularly in the field of wheeled motor vehicles.

Some of them are of a type that has both an automatic mode wherein an open/close movement of an automotive back door is carried out automatically with a power of an electric motor and a manual mode wherein the open/close movement of the back door is carried out manually without the aid of the power of the electric motor.

For achieving the two modes, there is usually employed an electromagnetic clutch through which the electric motor and the back door are selectively connected. That is, in the automatic mode, the clutch takes an engaged condition, so that the power of the motor is transmitted to the back door through the engaged clutch, while, in the manual mode, the clutch takes a disengaged condition, and thus the manual open/close movement of the back door is carried out without obstruction from the electric motor. Actually, there is further employed a speed reducing mechanism which, to increase a power for lifting up the back door, outputs a rotation of which speed is lower than that of the motor.

For keeping the back door at its full-open position, there are usually employed gas stays that support the weight of the back door with a force of compressed gas. However, if the gas stays fail to operate due to long use or damage of the same, it may occur that the back door assuming the full-open position falls down suddenly upon disengagement of the clutch, which is of course an undesirable movement.

For solving the above-mentioned undesired sudden falling of the back door, a measure is proposed by Japanese Laid-open Patent Application (Tokkai) 2001-107642. That is, in the measure, there is provided a control device which, upon sensing a sign of the falling of the back door, forces the clutch to take the engaged condition thereby stopping the falling of the back door by a marked resistance produced in a torque transmitting path from the motor to the back door.

SUMMARY OF THE INVENTION

However, even the measure of the above-mentioned published Japanese Application fails to adequately stand up to a distortion that is inevitably left in the torque transmitting path from the motor to the back door. That is, if such distortion is present, the back door in an open position is subjected to a sudden falling even in a small degree corresponding to the distortion upon disengagement of the clutch. However, this small falling of the back door has a possibility of bringing about the engaged condition of the clutch erroneously.

Accordingly, it is an object of the present invention to provide a control device of an automotive electric pivot door, which is free of the above-mentioned drawbacks.

According to a first aspect of the present invention, there is provided a control device for use in an automotive power pivot door. The automotive power pivot door includes a hinge device for permitting a door to pivot upward and downward between full-open and full-close positions about an upper end thereof relative to a vehicle body, a holder for holding the door at the full-open position, a reversible electric motor for driving the door to pivot upward and downward when energized and an electromagnetic clutch interposed between the motor and the door to selectively establish and break a torque transmission path from the motor to the door. The control device comprises a control unit which is configured to carry out a routine which comprises de-energizing the motor and disengaging the clutch when the door is lifted up to the full-open position; detecting a moved distance by which the door moves down from the full-open position within a first predetermined time (t1) from the time on which the clutch is disengaged; engaging the clutch when the detected moved distance is equal to or longer than a first predetermined distance (L1); disengaging the clutch again when a second predetermined time (t2) passes from the time on which the clutch is engaged; repeating the process for engaging and disengaging the clutch while following the routine; and judging that the holder fails to operate when the frequency of the engaged condition of the clutch indicates a predetermined frequency.

According to a second aspect of the present invention, there is provided, in an automotive power pivot door including a hinge device that permits a door to pivot upward and downward between full-open and full-close positions about an upper end thereof relative to a vehicle body, a gas stay that can hold the door at the full-open position when it is in a normal condition, a reversible electric motor that drives the door to pivot upward and downward when energized and an electromagnetic clutch that is interposed between the motor and the door to selectively establish and break a torque transmission path from the motor to the door, a system for detecting an abnormal condition of the gas stay. The system comprises a control unit which is configured to carry out de-energizing the motor and disengaging the clutch when the door is lifted up to the full-open position; detecting a moved distance by which the door moves down from the full-open position within a predetermined time (t1) that elapses from the time on which the clutch is disengaged; engaging the clutch when the moved distance is equal to or longer than a first predetermined distance (L1); disengaging the clutch again when a second predetermined time (t2) passes from the time on which the clutch is engaged; counting a frequency by which the clutch takes the engaged condition; and judging that the gas stay is in an abnormal condition when the counted frequency indicates a predetermined frequency.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
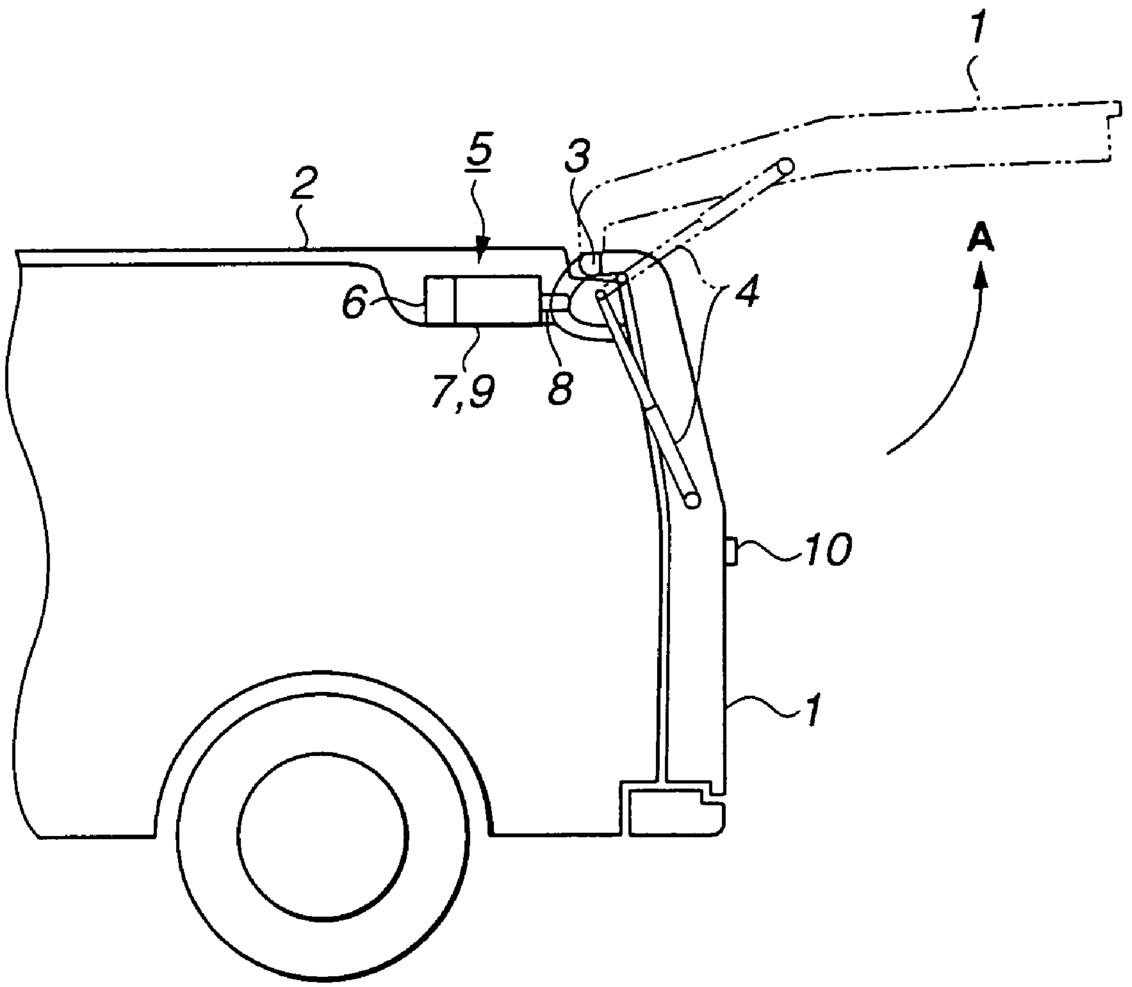
FIG. 1 is a back view of a motor vehicle, to which the present invention is practically applied.

Referring to FIG. 1 of the drawings, there is shown a rear portion of a motor vehicle to which the present invention is practically applied.

In the drawing, denoted by numeral 1 is a back door of which upper end is pivotally connected to a rear end of a roof 2 of the motor vehicle through hinges 3. Thus, the back door 1 can pivot upward to a full-open position where, as shown by a phantom line, the door 1 fully opens a rear opening of the vehicle and downward to a full-close position where, as shown by a solid line, the door 1 fully closes the rear opening.

Two gas stays 4 are respectively arranged at both sides of the rear opening of the vehicle body, each having one end pivotally connected to the vehicle body and the other end pivotally connected to the back door. Each gas stay 4 comprises a tube having a compressed gas contained therein and a piston rod slidably received in the tube having the piston exposed to the compressed gas.

That is, when, as is seen from FIG. 1, the back door 1 assumes the full-open position or a position near the full-open position, as illustrated by the phantom line, the gas stays 4 produce a force that biases the back door 1 in an opening direction, that is, in a direction of the arrow "A" of the drawing. With this, the back door 1 is kept at such open position.

Denoted by numeral 5 is a drive device that is installed under the roof 2 of the vehicle. As will be described in detail hereinafter, the drive device 5 comprises generally a reversible electric motor 6, a speed reducing mechanism 7 that outputs a rotation of which speed is lower than that of the electric motor 6, a pull/push rod 8 that connects an output part of the speed reducing mechanism 7 and the back door 1, and an electromagnetic clutch 9 that is incorporated with the speed reducing mechanism 7 and selectively establishes or breaks a torque transmitting path from the electric motor 6 to the back door 1. If desired, two drive devices 5 may be used, which are arranged at both sides of the rear opening of the vehicle body.

An operation switch 10 is mounted to an outer surface of the back door 1. As is understood from FIG. 2, a control switch "CS" is arranged near a driver's seat. In addition to the control switch "CS", a remote control switch "RCS" may be provided. That is, when the operation switch 10, the control switch "CS" or the remote control switch "RCS" is suitably manipulated by an operator (or driver), an after-mentioned control unit 20 functions to energize the electric motor 6 and the electromagnetic clutch 9. With this, a torque transmitting path is established by the clutch 9 and rotation of the electric motor 6 in a given direction induces upward or downward pivoting of the back door 1 about the hinges 3.

As will be described in detail hereinafter, the electric motor 6 and the electromagnetic clutch 9 are controlled by the control unit 20 that has a micro-computer installed therein.

It is to be noted that when the clutch 9 is in the engaged condition, the opened back door 1 is suppressed from falling due to a resistance produced by a combination between the motor 6 and the speed reducing mechanism 7 even if the gas stay or gas stays 4 fail to operate normally. That is, upon such failure of the gas stays 4, the weight of the back door 1 is about to rotate the output part of the speed reducing mechanism 7 in a reversed direction. However, due to a higher gear ratio established in the combination between the electric motor 6 and the speed reducing mechanism 7, such reversed rotation of the output part of the mechanism 7 is not permitted thereby producing a marked resistance against the falling of the back door 1.

A rotation sensor 11, such as a rotary encoder or the like, is arranged around a rotation shaft of the speed reducing mechanism 7 to detect a rotation angle of the rotation shaft, that is, to detect an angular position (or a moved distance) of the back door 1. Preferably, the rotation sensor 11 is a rotary encoder that can generate two two-phase pulses that are different by 90 degrees in phase. With this, a moved distance of the back door 1 and a moving direction of the same can be detected.

Figure 2:
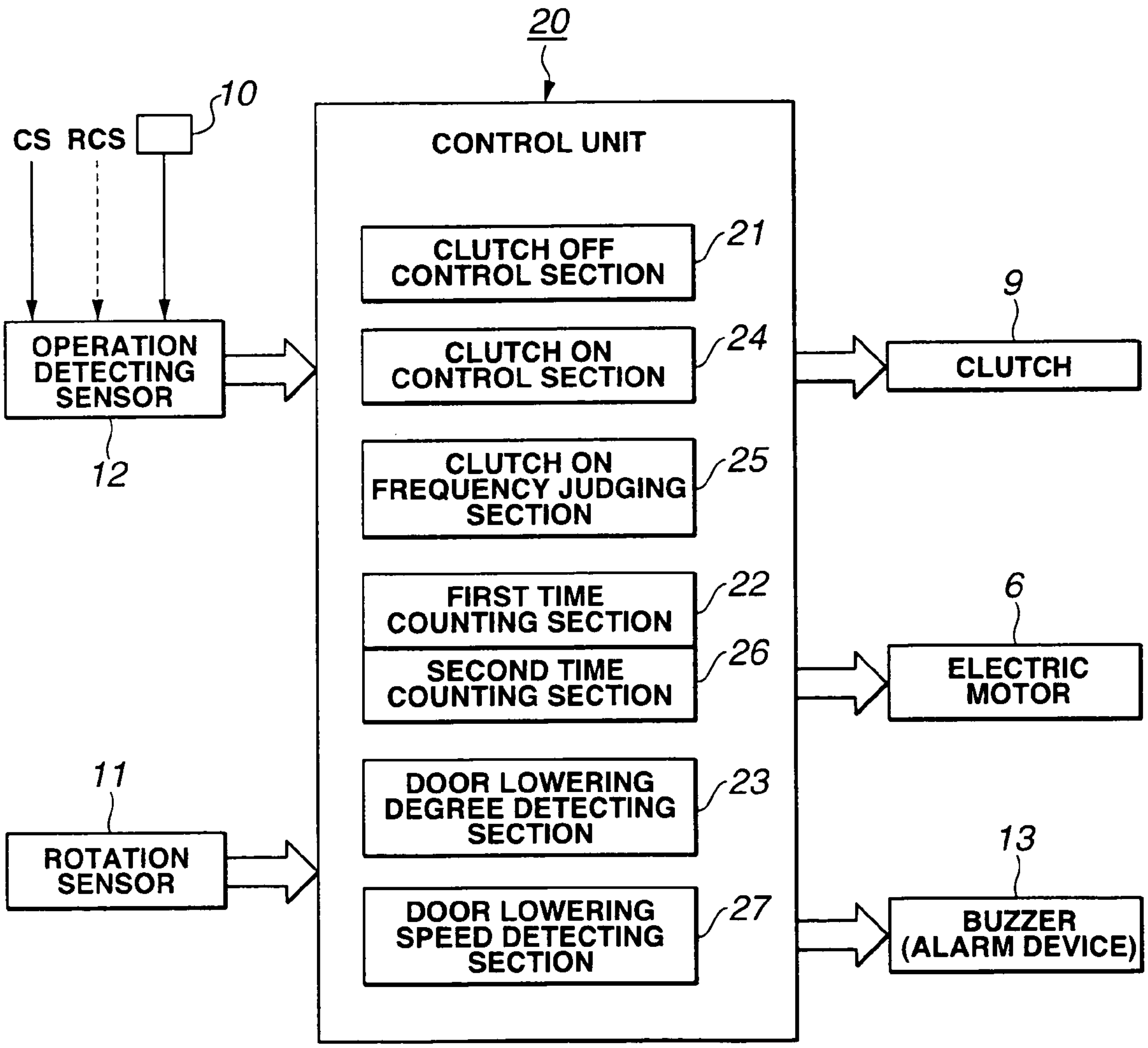
FIG. 2 is a block diagram of a control circuit employed in the present invention.

Referring to FIG. 2, there is shown a block diagram of a control circuit employed in the present invention.

The control circuit has a control unit 20, viz., micro-computer that comprises a central processing unit (CPU), a random access memory (RAM), a read only memory (ROM) and input and output interfaces. In the disclosed embodiment, a so-called one chip CPU is used as the central processing unit. As is known, the read only memory (ROM) stores control programs and the central processing unit (CPU) works with the aid of the random access memory (RAM).

To the control unit 20, there is fed an information signal from an operation detecting sensor 12 to which operation signals from the control switch "CS", the remote control switch "RCS" and the operation switch 10 are fed, as shown.

Furthermore, to the control unit 20, there is fed an information signal from the rotation sensor 11.

From the control unit 20, there are outputted instruction signals to the electric motor 6, the electromagnetic clutch 9 and a buzzer (viz., alarm means) 13.

The number of pulses issued from the rotation sensor 11 is counted by the control unit 20. That is, the number of pulses counted when the back door 1 comes to the full-close position is treated as an initial value, and the number of pulses is continuously counted when the back door 1 is being pivoted upward toward the full-open position. Thus, the counted number of the pulses from the initial value indicates the angular position (or open degree) of the back door 1. That is, when, by counting the pulses, the full-open or full-close position of the back door 1 is detected, the control unit 20 stops energization of the electric motor 6 and disengages the electromagnetic clutch 9.

That is, when the back door 1 is pivoted up to the full-open position, the control unit 20 de-energizes the motor 6 and disengages the clutch 9, and, as will be described in detail hereinafter, carries out judgment as to whether, within a first predetermined time "t1" from the clutch disengagement, a downward moved distance of the back door 1 from the full-open position exceeds a predetermined shorter distance "L1" or not. If the moved distance exceeds the predetermined shorter distance "L1", the control unit 20 engages the clutch 9, and when, thereafter, a second predetermined time "t2" passes, the control unit 20 disengages the clutch 9 again. That is, within the first predetermined time "t1", the process of detecting the downward moved distance of the back door 1 is carried out for a plurality of times.

As is understood from FIG. 2, the control unit 20 comprises a clutch OFF control section 21 that carries out the disengagement of the clutch 9 when the back door 1 is pivoted up to the full-open position, a first time counting section 22 that counts the first predetermined time "t1" from the time when the clutch OFF control section 21 carries out the disengagement of the clutch 9, a door lowering degree detecting section 23 that judges whether, within the first predetermined time "t1" from the clutch disengagement by the clutch OFF control section 21, the downward moved distance of the back door 1 from the full-open position exceeds the predetermined shorter distance "L1" or not, a clutch ON control section 24 that carries out the engagement of the clutch 9 when the downward moved distance of the back door 1 exceeds the predetermined shorter distance "L1", a clutch ON frequency judging section 25 that counts the ON frequency carried out by the clutch ON control section 24 and judges whether the counted ON frequency reaches a predetermined frequency "N" (viz., four in the illustrated embodiment) or not, a second time counting section 26 which, when the clutch ON frequency judging section 25 judges that the counted ON frequency does not reach the predetermined frequency "N", counts the second predetermined time "t2" from the time when the engagement of the clutch 9 is carried out by the clutch ON control section 24 and causes the clutch OFF control section 21 to carry out the disengagement of the clutch 9 upon counting the second predetermined time "t2".

When the clutch ON frequency judging section 25 judges the reaching of the predetermined frequency "N" (viz., when the section 25 counts four in ON frequency), the repeated process is ended and the motor 6 is energized to run in a direction to close the back door 1 thereby to carry out an after-mentioned door lowering emergency operation.

That is, judging the reaching of the predetermined frequency "N" by the judging section 25 means that the back door 1 is still lowering due to a failure of the gas stay or gas stays 4. Upon sensing this condition, the door lowering emergency operation is carried out with the aid of the electric motor 6 and clutch 9.

As will be seen from the above, the abnormal downward movement of the back door 1 from the full-open position, which would be caused by a failure (viz., lack of gas or the like) of the gas stay or gas stays 4, can be detected. During the abnormal downward movement of the back door 1, a certain braking is intermittently applied to the lowering back door 1 by repeating ON/OFF operation of the clutch 9. Once the braked lowering of the back door 1 comes to a given condition, the lowering of the back door 1 is assisted by the electric motor 6 and enforcedly directed toward the full-close position. That is, under this condition, the door lowering emergency operation is carried out by the control unit 20.

When the door lowering degree detecting section 23 judges that, within the first predetermined time "t1", the downward moved distance of the back door 1 exceeds the predetermined shorter distance "L1", the control unit 20 energizes the buzzer 13 to produce an alarm sound letting the operator or driver know the failure of the gas stay or gas stays 4.

When the door lowering degree detecting section 23 judges that, within the first predetermined time "t1", the downward moved distance of the back door 1 does not exceed the predetermined shorter distance "L1", the repeated process is ended thereby not to carry out the door lowering emergency operation. That is, under this case, it is considered that the gas stay or gas stays 4 are in a normal condition. Thus, the back door 1 keeps the full-open position.

As is seen from FIG. 2, the control unit 20 further comprises a door lowering speed detecting section 27 which, when the predetermined shorter distance "L1" is detected by the door lowering degree detecting section 23 within the first predetermined time "t1", judges whether the lowering speed of the back door 1 is higher than a predetermined speed "V1" or not. When the lowering degree detecting section 23 detects the predetermined shorter distance "L1" and the lowering speed detecting section 27 detects the lowering speed higher than the predetermined speed "V1", the clutch ON control section 24 carries out the repeated process, and when the lower speed detecting section 27 does not detect the lowering speed higher than the predetermined speed "V1", the repeated process is ended thereby not to carry out the door lowering emergency operation.

When, after having the repeated process, the door lowering degree detecting section 23 detects a predetermined longer distance "L2" that is longer than the predetermined shorter distance "L1", the control unit 20 engages the clutch 9 and ends the repeated process and carries out the door lowering emergency operation judging that the gas stay or gas stays 4 are in failure.

Furthermore, the door lowering degree detecting section 23 judges whether or not, within the second predetermined time "t2", the downward moved distance of the back door 1 from an open position established when the clutch 9 is disengaged by the clutch OFF control section 21 reaches to a predetermined distance that is larger than the predetermined shorter distance "L1". When, after having the repeated process, the door lowering degree detecting section 23 detects the predetermined distance, the control unit 20 ends the repeated process and carries out the door lowering emergency operation judging that the gas stay or gas stays 4 are in failure.

Figure 3:
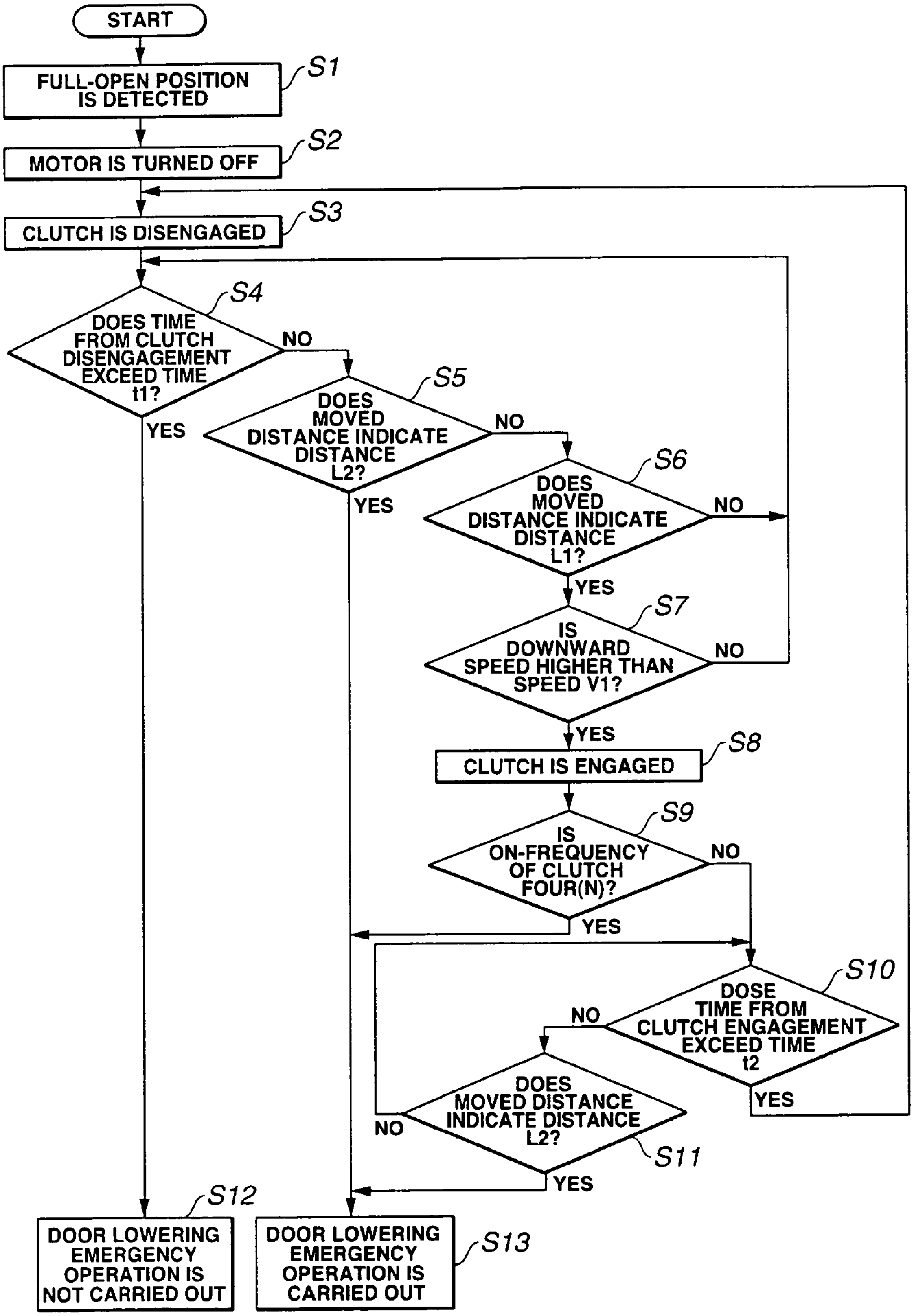
FIG. 3 is a flowchart showing programmed operation steps executed by a control unit of the control circuit.

Referring to FIG. 3, there is shown a flowchart that depicts programmed operation steps executed by the microcomputer of the control unit 20.

In the following, operation of the control device of an automotive power pivot door according to the present invention will be described with reference to FIGS. 1 and 2 and the flowchart of FIG. 3.

For ease of understanding, the description will be commenced with respect to a full-closed position of the back door 1. Under this condition, as is shown by a solid line in FIG. 1, the back door 1 fully closes the back opening of the vehicle. Although not shown in the drawing, a door lock device is provided on a lower peripheral portion of the back opening for locking the fully closed back door 1.

When, with the back door 1 assuming the full-close position, the operation switch 10 on the back door 1 is operated by an operator for the purpose of opening the door 1, the control unit 20 receives an open signal from the operation switch 10 through the operation detecting sensor 12. Upon this, the door lock device releases the back door 1 and then the control unit 20 engages the electromagnetic clutch 9 and energizes the electric motor 6 to run in a normal direction. With this, the back door 1 starts to pivot upward and lifts up toward the full-open position. When the back door 1 comes to the full-open position, the rotation sensor 11 detects the arrival of the door 1 at the full-open position from the rotation angle of the rotation shaft of the speed reducing mechanism 7.

More specifically, at step S1, by counting the number of pulses issued from the rotation sensor 11 that corresponds to the full-open position of the back door 1, the full-open position of the door 1 is detected.

Then, at step S2, the electric motor 6 is turned OFF, and at step S3, the clutch 9 is disengaged by the clutch OFF control section 21. If now the gas stay or gas stays 4 are in a normal condition, the back door 1 can keep the full-open position with the aid of the gas stays 4 without consuming electric power.

At step S4, judgment is carried out as to whether a time elapsed from the time of the disengagement of the clutch 9 exceeds the first predetermined time "t1" (for example, 300 ms) or not. For this judgment, the clutch OFF control section 21 and the first time counting section 22 of the control unit 20 operate. If YES at step S4, that is, when the time exceeds the first predetermined time "t1", the operation flow goes to step S12 so as not to carry out the door lowering emergency operation. That is, it is judged that the gas stay or gas stays 4 are in a normal condition, and the back door 1 keeps the full-open position.

While, if NO at step S4, that is, when the time does not exceed the first predetermined time "t1", the operation flow goes to step S5.

At step S5, judgment is carried out as to whether, within the first predetermined time "t1", a downward moved distance of the back door 1 from the full-open position that is established when the clutch 9 is disengaged at a first process indicates the predetermined longer distance "L2" (corresponding to 50 pulses) or not. For this judgment, the door lowering detecting section 23 operates.

If YES at step S5, that is, when the predetermined longer distance "L2" is detected, the operation flow goes to step S13 judging that the gas stay or gas stays 4 fail to operate normally. At step S13, the door lowering emergency operation is carried out and the back door 1 is pivoted down toward the full-close position with the force of the electric motor 6.

If NO at step S5, that is, when the predetermined longer distance "L2" is not detected, the operation flow goes to step S6.

That is, as is described hereinabove, the time elapsed from the time on which the disengagement of the clutch 9 is carried out is counted, and within the first predetermined time "t1", the clutch 9 is subjected to the ON/OFF control thereby applying a certain braking to the lowering movement of the back door 1.

Accordingly, in the first process, the step S6 never induces such a condition that the back door 1 is lowered from the open position by the predetermined longer distance "L2". Accordingly, in the first process at the step S5, it never occurs that the predetermined longer distance "L2" is detected, and thus the operation flow goes to step S6.

After having repeated process, the step S5 carries out judgment as to whether the cumulative downward moved distance of the back door 1 from the open position established at the first disengagement of the clutch 9 reaches the predetermined longer distance "L2" or not. If reaching to the predetermined longer distance "L2" is judged at this time, the operation flow goes to step S13 to carry out the door lowering emergency operation, judging that the gas stay or gas stays 4 are not in a normal condition.

At step S6, judgment is carried out as to whether the downward moved distance of the back door 1 from the open position established when the disengagement of the clutch 9 is carried out first reaches the predetermined shorter distance "L1" (corresponding to 5 pulses) or not. For this judgment, the door lowering detecting section 23 operates.

If YES at step S6, that is, when the predetermined shorter distance "L1" is detected, the operation flow goes t step S7 judging that the gas stay or gas stays 4 may have a lack of the gas contained therein.

If NO at step S6, that is, when the predetermined shorter distance "L1" is not detected, the operation flow goes back to step S4 judging that the gas stay or gas stays are in a normal condition, thus, upon expiration of the first predetermined time "t1" at step S4, the operation flow goes to step S12 judging that the gas stay or gas stays 4 are in a normal condition. In the step S12, the door lowering emergency operation is not carried out, as is mentioned hereinabove.

At step S7, judgment is carried out as to whether the lowering speed of the back door 1 is higher than the predetermined speed "V1" (viz., lower than 16 ms in pulse period) or not. If NO, that is, when the lowering speed is lower than the speed "V1", it is conceivable that the back door 1 is being lowered quite slowly. Accordingly, in this case, the operation flow goes back to step S4 judging that the gas stay or gas stays 4 may have a slight lack of gas contained therein, and thus, upon expiration of the first predetermined time "t1", the operation flow goes to step S12 judging the gas stay or gas stays 4 are in a normal condition. In this step S12, the door lowering emergency operation is not carried out, as is mentioned hereinabove.

While, if YES at step S7, that is, when the lowering speed of the back door 1 is higher than the predetermined speed "V1", the operation flow goes to step S8 judging that the back door 1 is suddenly dropped due to failure of the gas stay or gas stays 4.

At step S8, the engaged condition of the clutch 9 is established by the clutch ON control section 24. With this, the torque transmission path from the speed reduction mechanism to the back door 1 is established thereby braking the lowering of the back door 1.

After step S8, the operation flow goes to step S9. At this step S9, judgment is carried out as to whether the number of ON frequency counted reaches the predetermined frequency "N" (viz., four) or not. If NO, that is, when the counted number of ON frequency does not reach the predetermined frequency "N", the operation flow goes to step S10, while if YES, that is, when the counted number of ON frequency reaches the predetermined frequency "N" (viz., four), the operation flow goes to step S13. In the first process, the operation flow from step S9 goes to step S10.

At step S10, judgment is carried out as to whether the time elapsed from the disengagement of the clutch 9 reaches the second predetermined time "t2" (viz., 225 ms) or not. If YES, that is, when the time reaches the second predetermined time "t2", the operation flow goes back to step S3 for carrying out the above-mentioned operation steps. At step S3, the clutch 9 is disengaged by the clutch OFF control section 21, as has been mentioned hereinabove.

While, if NO at step S10, that is, the time elapsed from the disengagement of the clutch 9 does not reach the second predetermined time "t2", the operation flow goes to step S11.

At this step S11, judgment is carried out as to whether, within the second predetermined time "t2", the downward moved distance of the back door 1 from the open position established when the clutch 9 is disengaged at the first process indicates the predetermined shorter distance "L1" or not. If NO, that is, when the downward moved distance is smaller than the predetermined shorter distance "L1", the operation flow goes back to step S10 and there upon reaching the second predetermined time "t2", the operation flow goes back to step S3. Thus, thereafter, the process from step S3 to step S11 is repeated by at most "N" (viz., four) times.

When the downward moved distance of the back door 1 indicates the predetermined shorter distance "L1" at step S11, the operation flow goes to step S13. At this step, the door lowering emergency operation is carried out.

In the following, an advantageous function possessed by the control device of the invention will be described.

That is, it may occur that at a first process, the step S6 detects that the downward moved distance of the back door 1 from the full-open position is the distance “L1”, but at a second process, the step S6 does not detect such downward moved distance. In this case, it is conceivable that due to the disengagement of the clutch 9 at the first process, a distortion that has been left in the torque transmission path from the speed reducing mechanism 7 of the motor 6 to the back door 1 is released, so that the back door 1 is lowered by a degree corresponding to the distortion, and thereafter the back door 1 is assuredly held by the gas stays 4. Thus, at the second process, the step S6 judges that the gas stays 4 are in a normal condition. Thus, under this condition, the operation flow goes back to step S4 and goes to S12 and thus, the door lowering emergency operation is not carried out.

When the step S11 detects that, within the second predetermined time “t2”, that is, while the clutch 9 is kept engaged, the downward moved distance of the back door 1 is the predetermined longer distance “L2”, it is conceivable that the back door 1 has been lowered including a slippage of the clutch 9. Thus, in such case, the repeated process is stopped judging that the gas stay or gas stays 4 are in an abnormal condition, and thus the operation flow goes to step S13 to carry out the door lowering emergency operation.

Although the predetermined longer distance “L2” at step S1 is set equal to the predetermined distance “L2” at step S5, the equality is not always necessary in the invention. That is, such distances “L2” may have difference values so long as they are longer than the predetermined first distance “L1”.

As will be understood from the above description, in the present invention, after disengagement of the clutch 9, the falling or downward movement of the back door 1 is repeatedly checked by several times within a given time. Accordingly, whether or not the falling of the back door 1 has been caused by any distortion left in a torque transmission path between the speed reducing mechanism 7 of the motor 6 and the back door 1 is easily judged, and thus, any abnormal condition of the gas stay or gas stays 4 is easily and exactly detected.

The entire contents of Japanese Patent Application 2003-121566 filed Apr. 25, 2003 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. In an automotive power pivot door including a hinge device for permitting a door to pivot upward and downward between full-open and full-close positions about an upper end thereof relative to a vehicle body, a holder for holding the door at the full-open position, a reversible electric motor for driving the door to pivot upward and downward when energized and an electromagnetic clutch interposed between the motor and the door to selectively establish and break a torque transmission path from the motor to the door, a control device for controlling the power pivot door, the control device having a control unit that is configured to carry out a routine which comprises:

de-energizing the motor and disengaging the clutch when the door is lifted up to the full-open position;

detecting a moved distance by which the door moves down from the full-open position within a first predetermined time (t1) from the time on which the clutch is disengaged;

engaging the clutch when the detected moved distance is equal to or longer than a first predetermined distance (L1);

disengaging the clutch again when a second predetermined time (t2) passes from the time on which the clutch is engaged;

repeating the process for engaging and disengaging the clutch while following the routine; and judging that the holder fails to operate when the frequency of the engaged condition of the clutch indicates a predetermined frequency.

2. A control device as claimed in claim 1, in which the control unit comprises:

a clutch OFF control section that carries out the disengagement of the clutch upon reaching of the door to the full-open position;

a first time counting section that counts the first predetermined time (t1) passing from the time on which the disengagement of the clutch is carried out by the clutch OFF control section;

a door lowering degree detecting section that is capable of judging whether or not the door moves from the full-open position by the first predetermined distance (L1) within the first predetermined time (t1) from the time on which the clutch is disengaged by the clutch OFF control section;

a clutch ON control section that carries out the engagement of the clutch when the door lowering degree detecting section judges that the door moves by the first predetermined distance (L1);

a clutch ON frequency judging section that counts the frequency by which the clutch ON control section carries out the engagement of the clutch and judges whether the counted frequency shows a predetermined frequency or not;

a second time counting section that, when the counted frequency fails to show the predetermined frequency, counts the second predetermined time (t2) and when the second predetermined time (t2) passes, causes the clutch OFF control section to disengaged the clutch; and an instruction section that carries out a door lowering emergency operation when the clutch ON frequency judging section judges that the counted frequency shows the predetermined frequency.

3. A control device as claimed in claim 2, in which the control unit is configured so that when the door lowering degree detecting section judges that the door fails to move by the first predetermined distance (L1), the instruction section finishes a repeated process thereby not to carry out the door lowering emergency operation.

4. A control device as claimed in claim 3, in which the control unit further comprises a door lowering speed detecting section which, when the door movement by the first predetermined distance (L1) within the first predetermined time (t1) is judged by the door lowering degree detecting section, judges whether a lowering speed of the door is higher than a predetermined speed or not, and in which when the door movement by the first predetermined distance (L1) is judged by the door lowering degree detecting section and the lowering speed of the door higher than the predetermined speed is judged by the door lowering speed detecting section, the clutch ON control section carries out the engagement of the clutch.

5. A control device as claimed in claim 4, in which the control unit is configured so that when the door movement by the first predetermined distance (L1) within the first predetermined time (t1) is not judged by the door lowering degree detecting section, the instruction section finishes the repeated process and stops execution of the door lowering emergency operation.

6. A control device as claimed in claim 2, in which the control unit is configured so that when, due to the repeated process, the door lowering degree detecting section detects that the door moves by a second predetermined distance (L2) that is greater than the first predetermined distance (L1), the clutch ON control section carries out the engagement of the clutch and the instruction section finishes the repeated process and carries out the door lowering emergency operation.

7. A control device as claimed in claim 6, in which the door lowering degree detecting section of the control unit is capable of judging whether or not the door moves from the full-open position by the second predetermined distance (L2) within the second predetermined time (t2) from the time on which the clutch is disengaged by the clutch OFF control section, and in which when, due to the repeated process, the door lowering degree detecting section detects that the door moves by the second predetermined distance (L2), the instruction section finishes the repeated process and carries out the door lowering emergency operation.

8. A control device as claimed in claim 2, in which the door lowering emergency operation is carried out by energizing the electric motor to rotate in a direction to drive the door to pivot down the door.

9. A control device as claimed in claim 8, further comprising an alarm device that issues an alarm when the door lowering degree detecting section judges that, within the first predetermined time (t1), the door moves by a distance longer than the first predetermined distance (L1).

10. In an automotive power pivot door including a hinge device that permits a door to pivot upward and downward between full-open and full-close positions about an upper end thereof relative to a vehicle body, a gas stay that can hold the door at the full-open position when it is in a normal condition, a reversible electric motor that drives the door to pivot upward and downward when energized and an electromagnetic clutch that is interposed between the motor and the door to selectively establish and break a torque transmission path from the motor to the door, a system for detecting an abnormal condition of the gas stay, the system including a control unit which is configured to carry out:

de-energizing the motor and disengaging the clutch when the door is lifted up to the full-open position;

detecting a moved distance by which the door moves down from the full-open position within a predetermined time (t1) that elapses from the time on which the clutch is disengaged;

engaging the clutch when the moved distance is equal to or longer than a first predetermined distance (L1);

disengaging the clutch again when a second predetermined time (t2) passes from the time on which the clutch is engaged;

counting a frequency by which the clutch takes the engaged condition; and judging that the gas stay is in an abnormal condition when the counted frequency indicates a predetermined frequency.

11. An apparatus for controlling a door, comprising:

a reversible electric motor that drives the door in open and close directions;

an electromagnetic clutch interposed between the motor and the door to selectively establish and break a torque transmission path from the motor to the door;

a holder that holds the door at a full-open position; and a control unit that is configured to perform the following:

de-energizing the motor and disengaging the clutch when the door is in the full-open position;

detecting a distance that the door moves from the full-open position within a first predetermined time (t1) from the time the clutch is disengaged;

engaging the clutch when the distance is equal to or larger than a first predetermined distance (L1);

disengaging the clutch again when engagement of the clutch exceed a second predetermined time (t2); and determining whether the holder has failed based on a number of times the clutch has engaged.

* * * * *